US 7,003,167 B2

(12) United States Patent
Mukherjee

(10) Patent No.: US 7,003,167 B2
(45) Date of Patent: Feb. 21, 2006

(54) SINGLE-PASS GUARANTEED-FIT DATA COMPRESSION USING RATE FEEDBACK

(75) Inventor: Debargha Mukherjee, San Jose, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 702 days.

(21) Appl. No.: 10/036,663

(22) Filed: Nov. 1, 2001

(65) Prior Publication Data

US 2003/0081845 A1    May 1, 2003

(51) Int. Cl.
 *G06K 9/36* (2006.01)
(52) U.S. Cl. ...................... 382/239; 382/251
(58) Field of Classification Search ............ 382/232, 382/239–168, 250, 251–270; 375/240.03, 375/240.02, 240.14, 240.15, 240.05, 240.12, 375/240; 358/466; 341/61
See application file for complete search history.

(56) References Cited

U.S. PATENT DOCUMENTS

| 4,937,681 A | | 6/1990 | Fujinawa et al. | ........... 382/234 |
|---|---|---|---|---|
| 5,657,015 A | * | 8/1997 | Nakajima et al. | ............. 341/61 |
| 5,682,204 A | * | 10/1997 | Uz et al. | ............... 375/240.15 |
| 5,699,457 A | * | 12/1997 | Adar et al. | ................. 382/239 |
| 5,986,712 A | * | 11/1999 | Peterson et al. | ........ 375/240.14 |
| 6,023,297 A | * | 2/2000 | Kobayashi | ............. 375/240.03 |
| 6,075,819 A | * | 6/2000 | Saw | ........................... 375/240 |
| 6,084,636 A | * | 7/2000 | Sugahara et al. | ...... 375/240.03 |
| 6,094,455 A | * | 7/2000 | Katta | .................... 375/240.05 |
| 6,285,458 B1 | * | 9/2001 | Yada | ......................... 358/1.15 |
| 6,320,981 B1 | * | 11/2001 | Yada | ........................ 382/168 |
| 6,590,936 B1 | * | 7/2003 | Kadono | ................. 375/240.12 |
| 6,658,157 B1 | * | 12/2003 | Satoh et al. | ................ 382/239 |
| 6,944,357 B1 | * | 9/2005 | Bossut et al. | ............... 382/298 |

FOREIGN PATENT DOCUMENTS

| EP | 0774858 | 5/1997 |
|---|---|---|
| EP | 0874520 | 10/1998 |
| EP | 0997847 | 5/2000 |

\* cited by examiner

*Primary Examiner*—Wenpeng Chen

(57) ABSTRACT

An image-compression system provides for high-quality guaranteed-fit image block-by-block compression in a single pass. A baseline block-target allocator determines a baseline target size for the compressed blocks resulting from the source-image blocks. A block target-size accumulator determines a target block size by adding any excess compression from the preceding block to the baseline, as indicated by a compressed-block size reader. A mode selector performs a content analysis of the current block. It then selects among the compression modes guaranteed to meet the target block size one that achieves optimal image quality. A compression encoder compresses the current block according to the selected compression mode.

16 Claims, 7 Drawing Sheets

SINGLE-PASS GUARANTEED-FIT DATA COMPRESSION USING RATE FEEDBACK

BACKGROUND OF THE INVENTION

The present invention relates to data processing and, more particularly, to data compression. Certain embodiments of the invention provide for high-speed, high-quality, single-pass, guaranteed-fit, compression of continuous-tone compound documents (containing an arbitrary combination of text, graphics and photographic images).

Much of modern progress is associated with advances in computer technology, which have permitted ever more rapid and complex data processing. However, the amounts of data to be processed have easily kept pace with the increases in processing power. For example, scanning an 8×10 image at 24-bit color (continuous-tone) resolution and 300 dots per inch (dpi) results in about 20 MB of data. If the resolution is 600 dpi, the quantity of data is close to 80 MB, making image handling and processing a resource-intensive task.

In many applications, data compression is used to reduce the amount data required to represent an image. Data compression is the re-encoding of data in a more compact form. If the compressed data can be expanded to replicate the original (uncompressed) data, the compression is said to be "lossless". If this is not possible, the compression is said to be lossy. While lossless compression is preferable in principle, lossy compression can often achieve dramatically greater reductions in data. In the case of some images, dramatic reductions in data can be achieved using lossy compression with no perceptible loss of image quality. In other cases, even more dramatic reductions can be achieved with acceptable compromises in image quality.

In some applications, such as some laser printing applications, there is insufficient memory to store a full-size uncompressed image. In such applications, the image must be compressed so that the entire compressed image fits within a predetermined memory size. A compression scheme that guarantees that a target image size will be met is characterized as "guaranteed fit". Furthermore, from considerations of fast operation and low memory requirements, it must also be compressed as it is received, i.e., in a "single pass".

Not all image compression schemes are suitable for single-pass guaranteed-fit applications. The wavelet-based JPEG 2000 can guarantee a fit, but typically operates on an entire image (and so does not qualify as "single pass"); in addition, wavelet-based compression schemes are processor intensive and so exact a performance penalty.

Block-based compression schemes are well-suited for single-pass compression. Block-based compression schemes typically break an image into blocks, (e.g., 8×8 pixels) and compress the blocks individually. Common JPEG and block-truncation coding (BTC) are two such block-based compression schemes.

The popular JPEG compression scheme is block-based and as such can be used for single pass compression, but it provides no guarantee of fit in a designated buffer in a single pass; also, for rare pathological images it may even expand rather than compress.

"Block Truncation Coding" (BTC) (first proposed by E. J. Delp and O. R. Mitchell, "Image Compression using block truncation coding," *IEE Trans. Comm.*, vol. COM-27, pp. 1335–42, 1979) refers to a family of coding techniques where small blocks (typically 4×4) of monochrome images are represented with two grayscale levels 8 bits each, and a 1-bit/pixel binary mask denoting the level to use for each pixel. While the coding scheme is lossy in principle, it is to be noted that for blocks with only two levels—as is commonly encountered in text and graphics portions of an image—the scheme becomes lossless. A comprehensive survey of BTC encoding is presented by P. Franti, O. Nevalainen, T. Kaukoranta, "Compression of digital Images by block truncation coding: a survey," *Computer Journal*, col. 37, no. 4, pp. 308–32, 1994.

Vector Quantization (VQ) refers to a popular signal compression scheme where multiple scalar elements are grouped together and reproduced using a few vector reproduction levels. VQ is discussed in A. Gersho and R. M. Gray, *Vector Quantization and Signal Compression*, Boston, Mass.: Kluwer, 1992. For RGB color images, BTC may be combined with VQ to yield a family of techniques called BTC-VQ, as disclosed in Y. Wu and D. C. Coll, "Single bit-map block truncation coding of color images," *IEEE J. Selected Areas in Comm.*, vol. 10, pp. 952–959, and in T. Kurita and N. Otsu, "A method for block truncation coding for color image compression," *IEEE trans. Commun.*, vol. 41, no. 9, pp. 1270–74, September 1993. In BTC-VQ, small blocks (typically 4×4) of RGB color images are represented with two RGB reproduction levels 24 bits each, and a 1-bit/pixel binary mask. Thus, a compression ratio of 6:1 is immediately achieved for 4×4 blocks.

BTC-VQ can achieve single-pass guaranteed fit corresponding to 6:1 compression using 8×8 blocks, and greater guaranteed fit compression using larger blocks. However, BTC-VQ can result in visible artifacts in continuous-tone photographic images, especially if more than 6:1 compression is desired, forcing using of larger blocks.

Common JPEG is a block-based compression scheme that works well with continuous tone photographic images. JPEG allows a flexible tradeoff between compression and resulting image quality via selection of a "quality factor". Normally, a guaranteed fit is achieved in JPEG by trial-and-error selection of quality factors, with each "trial" being a separate pass. To accomplish guaranteed fit in one pass regardless of the image, a sufficiently low quality factor must be selected. With such a low quality factor, the resulting image quality can be visibly degraded, especially in text and graphics portions of compound documents.

Some optical character recognition and other programs, such as Omnipage by Caere, divide an image into text and non-text blocks via a prescan so that the two types of blocks can be treated separately. However, such prescan techniques do not meet the single-pass requirement. Accordingly, there is still a need for a high-quality, high-speed, single-pass, guaranteed-fit compression scheme for compound documents.

SUMMARY OF THE INVENTION

The present invention provides for regulating a compression scheme during data compression as a function of an in-progress measure of compression. To the extent the compression of leading data exceeds its target, the resulting unused memory is reallocated to adjust the target memory size for trailing data. Preferably, the compression scheme is "greedy" in that it is adjusted to consume the reallocated memory as soon as possible given the guaranteed-fit constraint.

For example, if 6:1 compression is required for the target image, a first block will be compressed using a compression mode designed to guarantee 6:1 compression. If in fact, 12:1 compression is achieved, half the memory "reserved" for the first block remains unused. This unused memory is then reallocated to the second block, so weaker compression is acceptable for the second block; in this case, the compression scheme is adjusted to guarantee 9:1 compression for the second block. Note that if sufficient memory is saved, a block can be transmitted raw (uncompressed).

Among the modes guaranteeing a fit to the target block size, a set of highest-expected-quality modes can be identified; this set includes a mode with the highest expected quality and any modes that differ at most insignificantly from it in expected quality. From the set of highest-expected-quality modes, the mode with the greatest compression is selected to maximize the memory saved for compressing the next block.

Preferably, the compression mode selected for a block is selected from a family of modes best chosen to match the block's content. Thus, while BTC-VQ can serve as a default mode family, blocks with few colors (as often occur with text and simple graphics) can be more effectively compressed using an n-color compression mode.

In addition to BTC-VQ and n-color modes, the invention provides for a family of interpolated compression modes that are particularly effective when the block analysis indicates the gradients represented in the block are small. As indicated above, an image block can be transmitted uncompressed when the allocated target size is sufficient. More generally, uncompressed transmission can be consider one of a family of raw modes that also include "truncated raw" modes, in which color data is compressed simply by leaving off the least-significant bits. Other mode families can be used with the invention depending on the types of images being compressed and the processing power available.

The invention provides for different schemes to meet different speed-versus-effectiveness requirements and to handle different source image resolutions. For example, where speed is at a premium, 6:1 compression of a 300 dpi image can be obtained without multiplications; however, 12:1 compression of the same image is readily achieved using a high-performance embodiment of the invention using few multiplications per encoder stage. A high-resolution embodiment of the invention achieves 15:1 compression for 600 dpi images.

For any of these embodiments, the complexity of the proposed encoder and decoder is orders of magnitude smaller than other known image-compression algorithms. At most, only a few multipliers are needed at any stage of the encoder and none whatsoever in the decoder. For compound documents, text is always compressed lossless, and depending on the type of image, the actual compression ratio achieved can be 200:1 or higher.

Since it provides adaptive image compression based on a block-by-block image analysis, the inventive compression scheme is better adapted to compound documents than any fixed-mode compression scheme. Overall, the present invention provides performance that is highly competitive with the more expensive algorithms like JPEG-LS and JPEG, and this performance is achieved in a single pass at much lower cost in both software and hardware. Certain embodiments of the invention provide other advantages in addition to or in lieu of those described above as is apparent from the description below with reference to the following drawings.

DETAILED DESCRIPTION OF THE PREFERRED EMBODIMENTS

Figure 1:
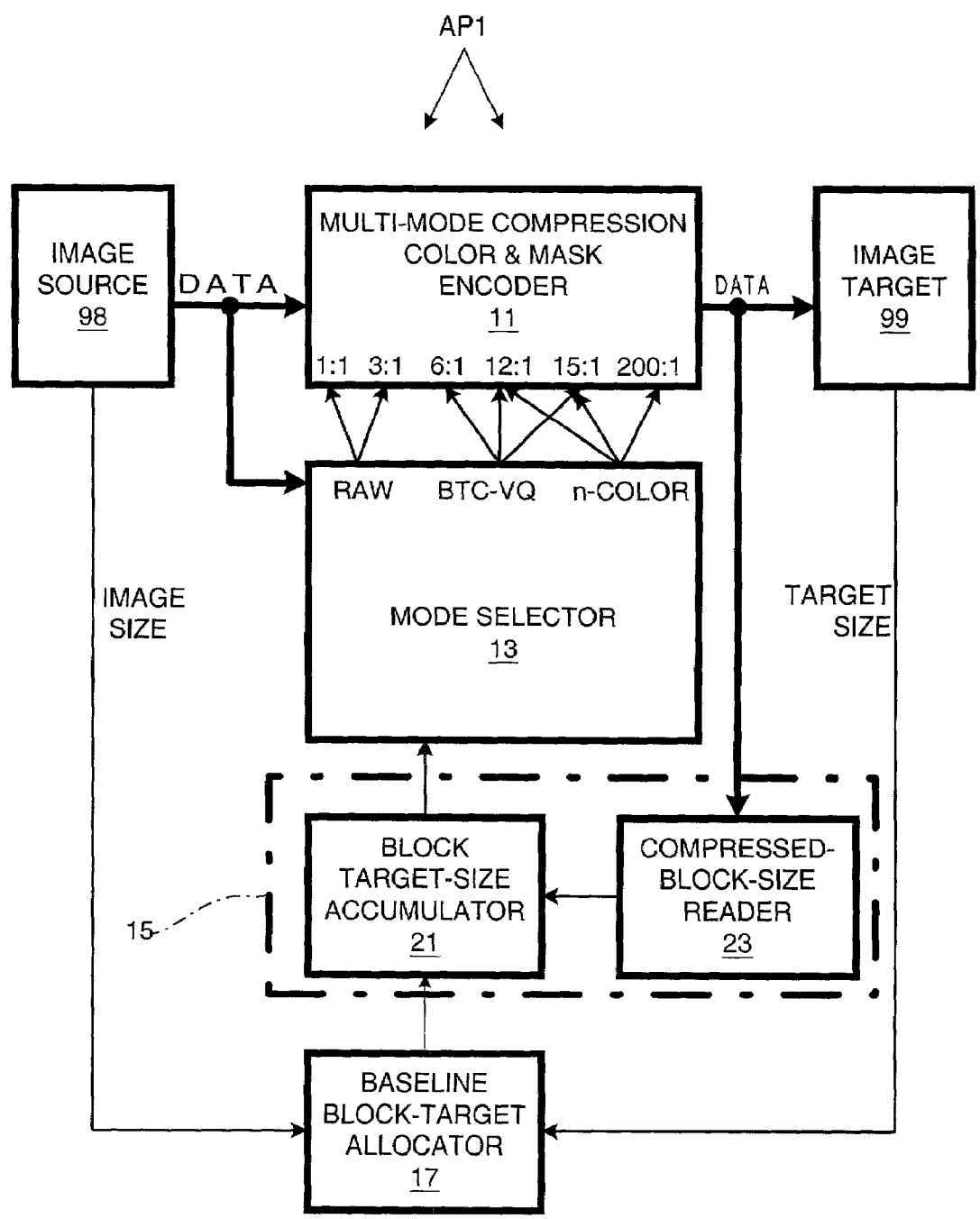
FIG. 1 is a schematic diagram of a compression system in accordance with the present invention.

In accordance with the present invention, a compression system AP1 receives image data from an image source 98 and provides compressed image data to an image target 99, as shown in FIG. 1. Compression system AP1 can be embedded in a color laser printer that also includes image target 99 in the form of an image-storage buffer. Image source 98 can be a host computer; the source image data need not be accessible at any one time by compression system AP1. Instead, image source data is serialized, e.g., as a series of blocks, for presentation to compression system AP1.

Compression system AP1 comprises a compressor-encoder 11, a mode selector 13, an evaluator 15, and a baseline-block-target allocator 17. Baseline-block-target allocator 17 determines the amount of compression required to achieve a desired target size for an image. This determination is made by comparing a source-image size (typically indicated in a header for the source image file) with a known capacity of image-target 99.

Mode selector 13 selects a specific encoding mode to be implemented by encoder 11. Mode selector 13 analyzes each source image block to determine the optimal mode family for compressing each block. The mode families include BTC-VQ, n-color, raw, and, optionally, interpolated modes. Each mode family can include plural modes that achieve different levels of compression, as indicated in FIG. 1 by the arrows from mode selector 13 to encoder 11. Note that the compression levels are roughly indicated for expository purposes.

Evaluator 15, which includes a block target-size accumulator 21 and a compressed block-size reader, determines the block target size. The target size for the first block is the baseline target size, as determined by allocator 17. For succeeding blocks, the target size is the baseline target size plus the target size of the preceding block (stored by accumulator 21) minus the size of the previous compressed block. Reader 23 reads the size of the previously compressed block from the header of the compressed block file.

Figure 2:
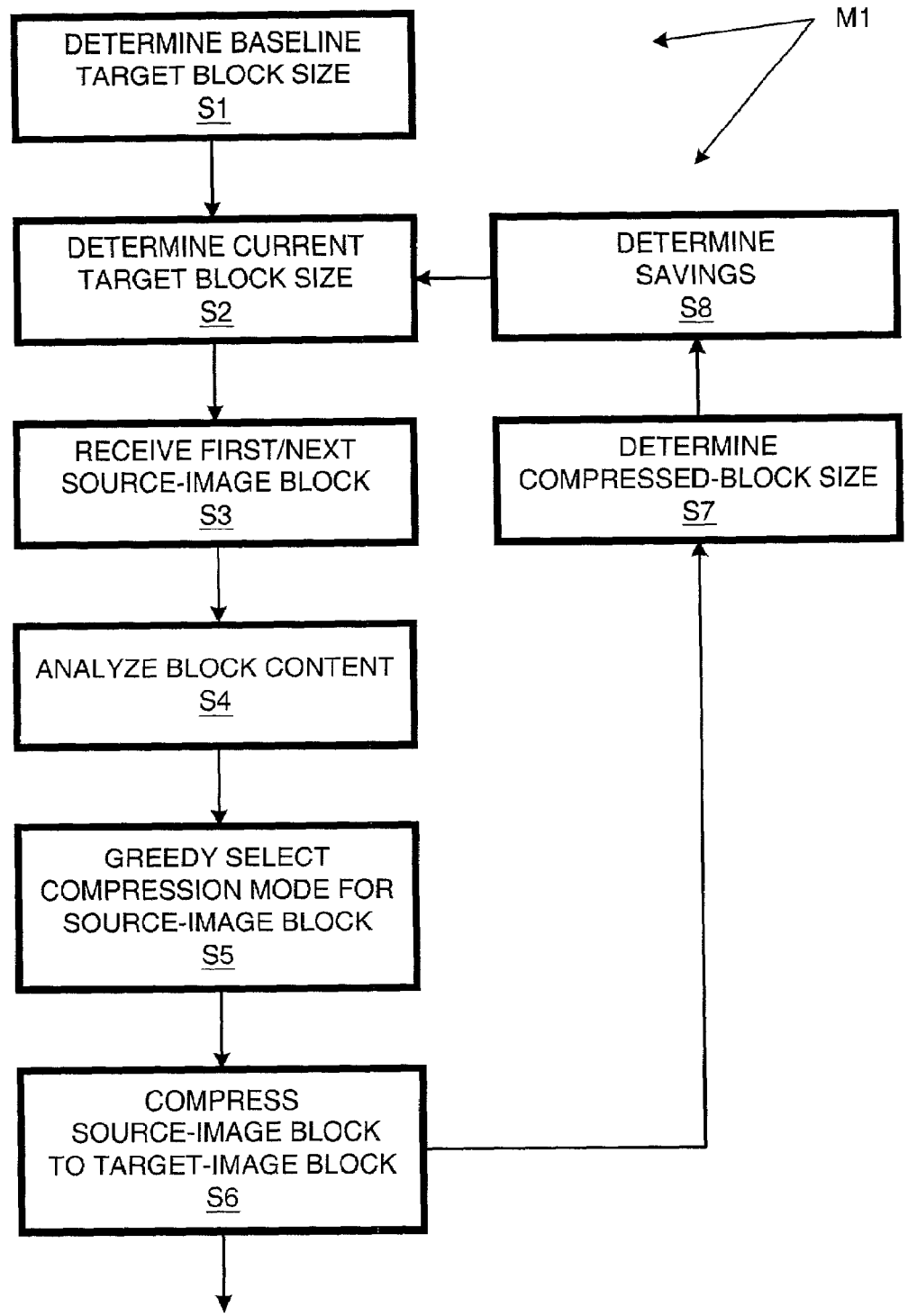
FIG. 2 is a flow chart of a generalized method of the invention practiced in the context of the system of FIG. 1.

A compression method M1 as implemented by compression system AP1 is flow-charted in FIG. 2. At step S1, method M1 determines a baseline block target size, which if met for each block would yield the desired overall target size for the compressed image. Typically, the overall target size is predetermined by the overall system AP1, while the source image size is typically read from a header in the source-image data. The baseline block target size is the source-image block size multiplied by the ratio of the source image size divided by the target image size. In other words, the baseline compression ratio for the blocks is the same as the target compression ratio for the entire image.

For example, if the source image is 80 MB and the memory available for the compressed image is 10 MB, then the target compression ratio is 8:1. The source image block size is typically 8×8 pixels and 24-bits per pixels, which is 1536 bits or, equivalently, 192 bytes. The target block size is the source block size divided by the target compression ratio, in this case 192/8=24 bytes.

At step S2, a current target-block size is determined. For the first iteration of step S2, the current target-block size equals the baseline target-block size determined in step S1. For subsequent iterations of step S2, the current target-block size is the baseline target-block size plus the "savings" determined at step S8 for the preceding block.

At step S3, the source image data is received and processed serially. Herein, "serially" means that the data is not processed all at once, but in some order so that feedback from leading image data can be used to affect the compression of trailing image data. For the present purposes, the processing is serial even if different sections of the image are being processed in parallel, as long as each parallel stream is processed as a series. Note that steps S2 and S3 are not causally linked so they can occur in reverse order or concurrently.

Figure 3:
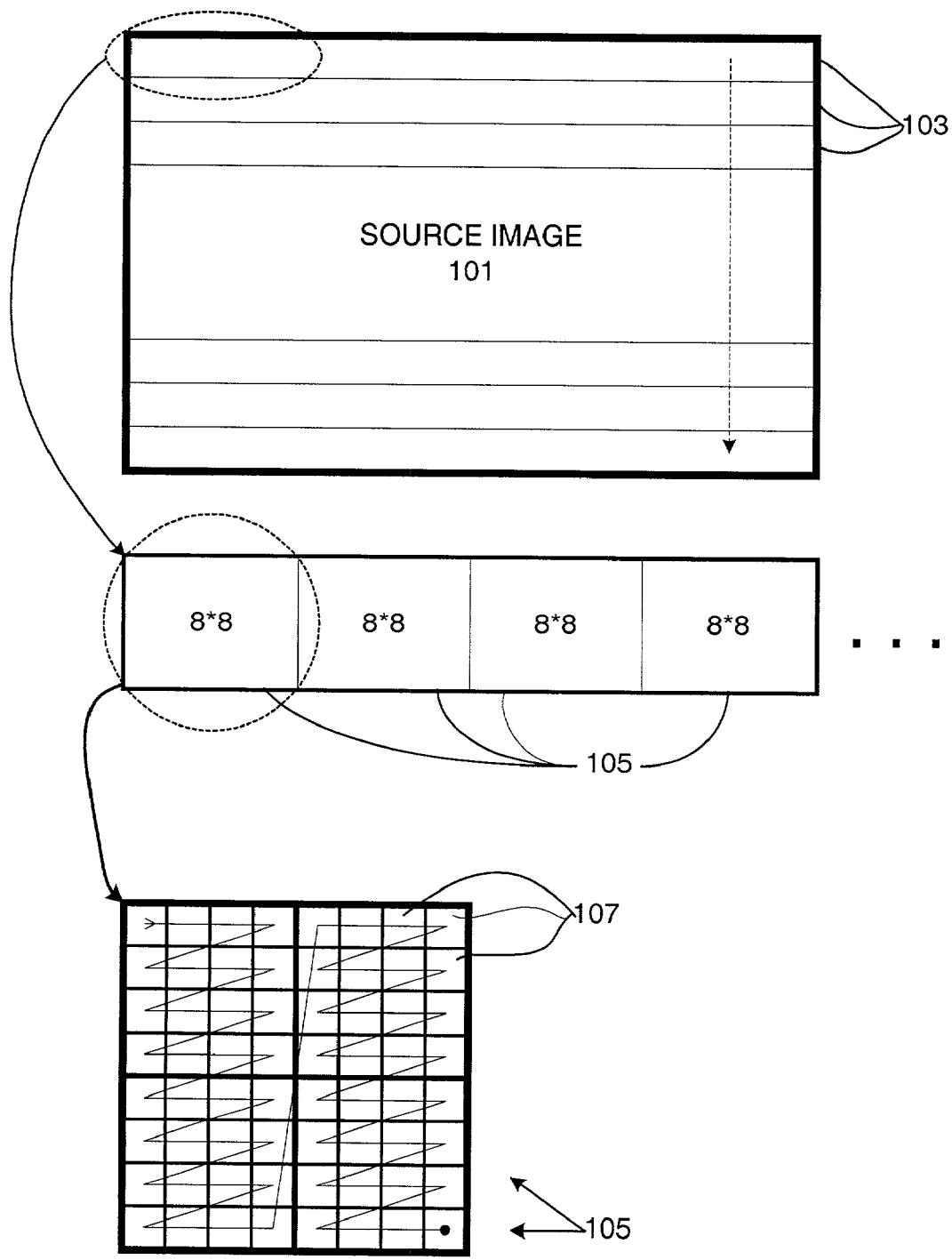
FIG. 3 is schematic view with varying levels of detail of an image showing the scanning order for that image.

Source image 101 is in true-color (24-bit per pixel) RGB format. As indicated in FIG. 3, it is received as a series of strips 103; each strip is received as a series of blocks 105; and each block is received as a series of picture elements (pixels) 107. In this case, step S3 and subsequent steps apply on a block-by-block basis. Thus, in the first iteration of step S3, the first source-image block is received.

More generally, the source image can be serialized in other ways. For example, the image can be presented first as coarse blocks, followed by fine blocks encoded as deviations from the coarse blocks. Also, fractal image data can be received. Of course, the compression scheme is selected to correspond to the source image data format.

At step S4, FIG. 2, the block content is analyzed. For example, the number of distinct colors in a block can be ascertained to determine whether an n-color mode should be used to compress the block. Depending on circumstances to be detailed below, color range, clustering, and gradient characteristics can be examined with an end toward mode selection.

At step S5, the compression mode for the block is selected. Modes that cannot guarantee a fit to the current target block size determined in step S2 are excluded from consideration. From the remaining modes, a set of highest-expected-quality modes is determined. This set includes a mode with the highest-expected-quality and any other modes with expected qualities that differ insignificantly from the highest-expected-quality mode. From this set, the mode that achieves the strongest compression is selected to optimize savings for the next block. In a refinement for the final block, the highest-expected-quality mode is selected without regard to savings.

At step S6, the current image block is compressed according to the compression mode selected in step S5. In FIG. 2, the arrow extending downward from step S6 indicates the compressed data being directed to the target storage area. Method M1 completes once step S6 is performed for the last block; steps S7 and S8 apply to all blocks but the last.

At step S7, the size of the compressed block resulting from step S6 is determined by compressed block-size reader 19 (FIG. 1). The difference between the determined compressed block size and the target block size for the current block is the "savings" in capacity. If the compressed block size equals the target block size for a block, the savings is zero. However, if, as often is the case, the compressed block size is less than the target block size for a block, the savings is the difference. The savings determined at step S8 is added to the baseline to determine the target size for the next iteration of step S2 for the next image block. The family and mode selections of steps S4 and S5 guarantee that the compressed block size cannot be greater than the target block size for any block.

Method M1 provides for fast, high-performance, and high-resolution variants. A "fast" variant of method M1 is charted in FIG. 4 as method M2. The primary objective in this "fast" variant is to create a compound document codec that operates super fast at both the encoder and decoder ends, and achieves a guaranteed compression ratio of 6:1 for all documents irrespective of content. The quality is visually lossless for all computer-generated documents at resolution 300 dpi and above. There are no multipliers used at any stage of the encoding or decoding operation. In fact, the complexity in fast method M2 is far lower than any known compound document encoder.

At step S21, an image block is received; its target-block size has already been determined. Steps S22 and S23 collective assign the block to a compression mode. At step S22, if a block has four or fewer colors it is assigned to the n-color mode family. If a block has more than four colors, it is assigned at step S23 to the BTC-VQ mode family unless there is room to transmit the block raw. In the latter case, step S23 assigns the block to the "raw" mode family, which, in fast method M2 only includes one mode: untruncated raw.

Encoding is performed at step S30. If, at step S22, the block was determined to have four or fewer colors (as it might if it were text or simple graphics), it is encoded losslessly using a 1, 2, or 4-color mode with 24-bit colors at step S31. A four-entry adaptive color dictionary is used to further the compression. Only colors not in the dictionary need to be encoded raw; those in the dictionary can be transmitted as dictionary indices. In cases where the available bytes are not sufficient to transmit colors raw, each color is quantized to 12 bits and included in the bit stream without use of the dictionary. The n-color bit stream is then run-length encoded.

In the n-color mode, the required colors, either new or from the dictionary, along with binary or 4-ary mask data, are transmitted to the decoder with an explicit header. If three colors are found, it is transmitted as a 4-color block with a dummy dictionary color. If a single color is found, run-length encoding is used.

If, at step S23, the block is determined to have more than four colors (as it is likely to have if it is part of a continuous-tone image), and there is sufficient target capacity (192 bytes), it can be left uncompressed (raw) at step S33.

Figure 5:
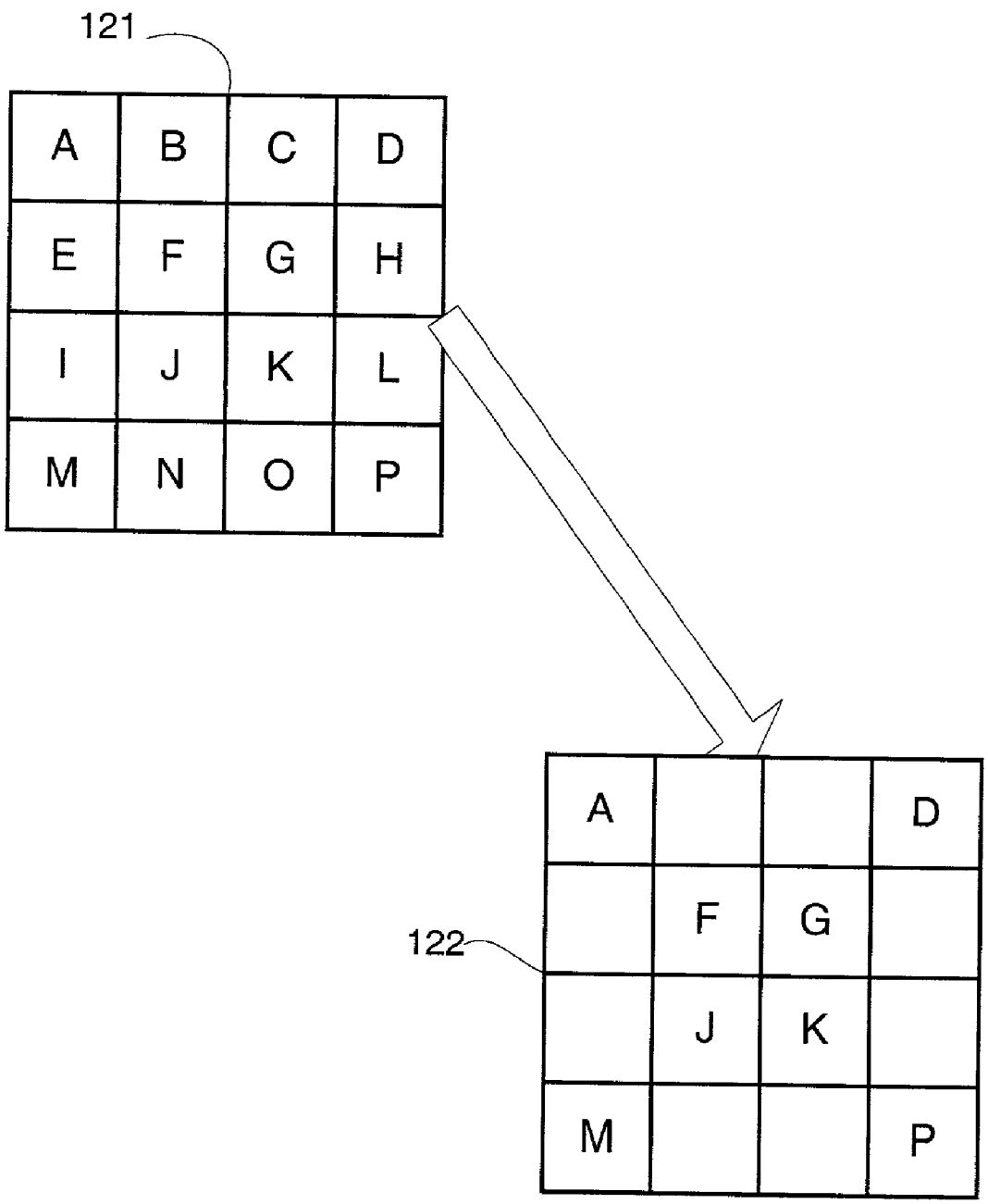
FIG. 5 is a schematic diagram illustrating the use of a mask in adaptive mask compression used in fast and high-quality implementations of the method of FIG. 2.

If the block has more than four colors and there is insufficient target capacity for untruncated raw transmission, BTC-VQ encoding is applied to the block at step S34–S36. Only the 4×4 BTC-VQ mode with 24-bit colors is used is used in fast method M2. In the illustrated embodiment, the luminance of the block is calculated at step S34. A block-transform coding is applied to the luminance map at S35. In this case, the 8×8-pixel block is broken into four 4×4-pixel quarters. The 24-bit colors are encoded and transmitted along with a binary mask at step S36. Normally, the mask data for each 4×4 sub-block requires two bytes. However, when adaptive mask compression is turned on, a single byte can be transmitted for a 4×4 sub-block. See FIG. 5, comparing uncompressed mask 121 with compressed mask 122.

The compressed data from steps S32, S33, and S36 represents the end of method M2 as far as the current block is concerned. However, the compression rate is fed back for use in the next iteration of step S23 for determination of whether there is room for raw transmission of the next block if it has five or more colors. Since the n-color modes and the 4×4 BTC-VQ mode achieve 6:1 compression, the feedback is only applied to determine whether or not the raw mode is used.

Figure 4:
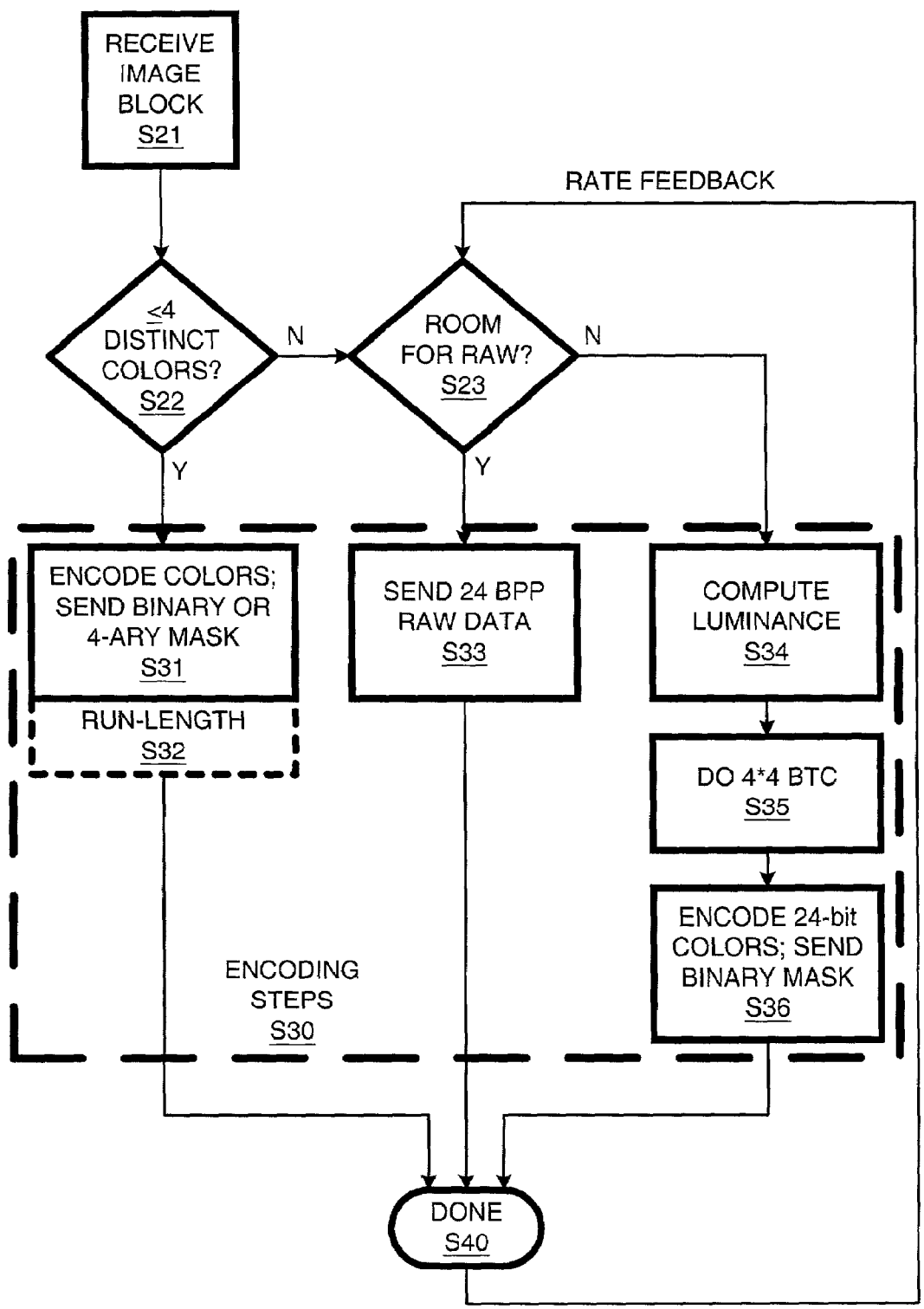
FIG. 4 is a flow chart of a "fast" implementation of the method of FIG. 2.

Note the correspondence between the steps of method M2 shown in FIG. 4 and the steps of method M1 shown in FIG. 2. Step S21 corresponds to step S3, receiving an image block. Step S22 corresponds to step S4. Step S23 and the lines to step S30 correspond to step 5. Step S30 corresponds to step S6. Step 40 roughly corresponds to steps S7 and S8.

A significant portion of the complexity of the fast encoder is attributed to BTC-VQ; accordingly it is important that it be optimized for speed. In the fast variant, the BTC-VQ encoder is two-level vector quantizer (VQ) for each 4×4 sub-block, with the (R, G, B)-triplets for the pixels acting as the training set. While the optimal strategy is to use the LBG VQ design procedure taught by Y. Linde, A. Buzo, and R. M. Gray, "An algorithm for vector quantizer design," *IEEE Trans. Commun.*, vol. COM-28, no.1, pp. 84–95, January 1980, iterating until convergence between optimizing the encoding and the decoding rules, the complexity of such a scheme is too high for what fast variant M2 is targeted for. Therefore, a sub-optimal but fast design procedure is used as follows.

Three-dimensional RGB vectors are mapped to one-dimensional space, and a single iteration of Lloyd's design procedure as described in S. P. Lloyd, "Least Squares Quantization in PCM," *IEEE Trans. Inform. Theory*, vol. IT-28, pp. 127–35, March 1982. This design procedure is used on the resulting scalar training set with the L infinity distortion measure. In particular, the mapping from 3-dim to 1-dim space is accomplished by either an approximate luminance transformation (R+2G+B)/4, or just by selection of the R, G, or B color that has the maximum spread in the sub-block. The search for the color with the largest spread usually leads to slower encoding than the luminance transformation, but it also leads to lower distortions.

In the one-dimensional space for each 4×4 block, the minimum value m and the maximum value M are determined. Let mid=(M+m+1)/2; let also M1 be the minimum value in the block such that M1>=mid and m1 be the maximum value in the block such that m1<=mid. Reconstruction points are calculated as the values (RGB(M1)+RGB(M)+1)/2 and (RGB(m1)+RGB(m)+1)/2, where RGB(x) denotes the original RGB value that corresponds to the value of x The threshold for the classification is the mid value. The implementation is very simple, and requires only three passes through the whole 4×4 block.

Figure 6:
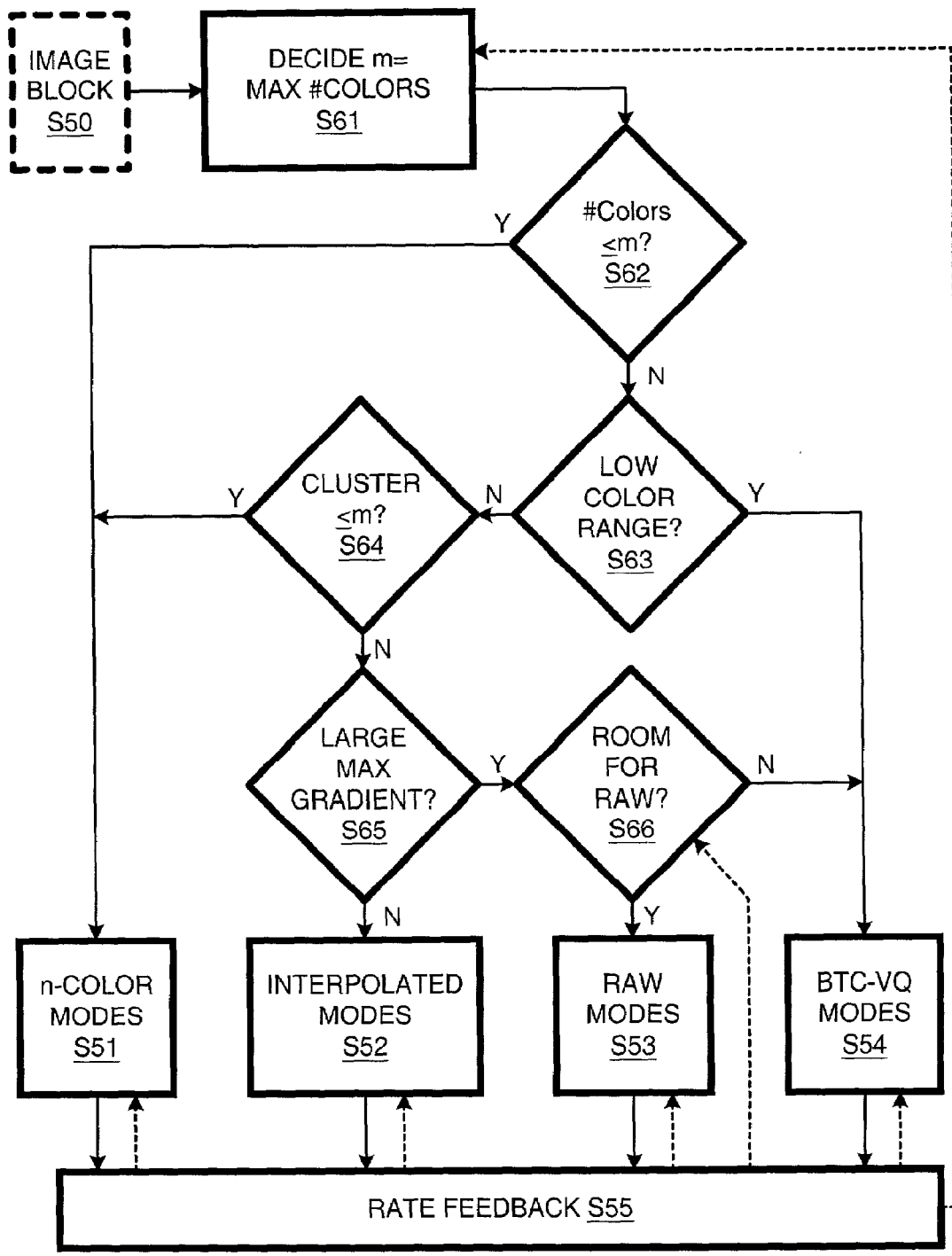
FIG. 6 is a flow chart of a "high-performance" implementation of the method of FIG. 2.

A "high-performance" variant method M3, charted in FIG. 6, applies more processing power to achieve greater compression than fast variant M2. Method M3 uses a flexible compound document codec that guarantees a compression ratio of up to 12:1 for all documents irrespective of content, while maintaining a level of encoding and decoding complexity lower than most known algorithms. To achieve this relatively high compression ratio, rate feedback is used at almost every stage to save bytes wherever possible.

The quality is visually lossless for both computer-generated as well as high-quality scanned documents at resolution 300 dpi and above. Method M3 is somewhat robust to scanning noise (more so than method M2). Furthermore, the desired minimum compression ratio is supplied as a parameter to the encoder. The limit of 12:1 is solely cautionary and based entirely on quality considerations. It is in fact, possible to run the encoder with minimum desired compression ratio larger than 12:1, and the degradation in quality beyond 12:1 is gradual.

Method M3 begins with receiving an image block at step S50, its target size being determined in a previous iteration of variant M2. Method M3 results in the current block being encoded according to n-color modes S51, interpolated modes S52, raw modes S53, and BTC-VQ modes S54.

Mode selection at step S61 begins with a decision regarding a maximum number of colors $m \leq 8$ that can be transmitted in the n-color mode, with the current available bytes. This figure is obtained based on the number of bytes required to transmit m colors in m-color mode with 12-bit colors. The number of currently available bytes is a function of the target compression ratio and the rate feedback from step S55.

In effect, step S61 selects a classification scheme. This classification scheme is used in step S62 to determine whether or not an n-color mode S51 is to be used for compression. The eight n-color levels (n=1–8) are used with either 12-bit or 24-bit colors; an adaptive color dictionary is used for most of the n-color modes.

At step S62, a color counting routine checks to see if there are m or fewer distinct colors in the block using exact 24-bit color matches. In particular, pixels are scanned sequentially, and are either found to be exactly equal in color to one of the previously encountered colors, or used to create new colors. If the number of colors in the current block is less than or equal to m (e.g., indicating text or simple graphics), the colors obtained are transmitted in n-color mode. The color dictionary is consulted initially to check if any of the distinct colors already exist in it. Eventually however, depending on the current available bytes, either 24-bit colors with dictionary, or 12-bit colors without the color dictionary are transmitted. If the number of colors is greater than m, (as would be likely given a continuous-tone image block), method M3 proceeds to step S63.

Step S63 determines whether the maximum color range, given by $\max[R_{max}-R_{min}, G_{max}-G_{min}, B_{max}-B_{min}]$, of the R, G, and B components in the 8×8 block is large (greater than a threshold $T_{HC}$) or small (less than or equal to $T_{HC}$). If the computed color range is below the threshold, the block is compressed using BTC-VQ at step S54. In method M3, 4×4, 8×4, and 8×8 BTC-VQ modes are used with either 12-bit or 24-bit colors, and adaptive mask compression is used. If the color range is less than or equal to the threshold, method M3 proceeds to step S64.

At step S64, a color clustering routine determines whether the colors can be clustered into m or fewer color clusters. The color clustering routine uses a single pass clustering technique, where pixels are scanned sequentially, and are either included in one of the previous clusters if close enough, or used to create new clusters if significantly different from all previously created clusters. If m or fewer clusters are obtained, the block is represented in n-color mode with the representative colors being the average or the mid-point of the respective clusters. For color encoding, as in the case for distinct colors, either 24-bit colors with dictionary, or 12-bit colors without dictionary are used, based on the available bytes figure. Note that it is this clustering stage that incorporates robustness to scanning noise in the algorithm. If the number of clusters required is greater than m, method M3 proceeds to step S65.

At step S65, the maximum of the horizontal and vertical gradients is compared against a threshold $T_{GR}$. If the maximum color gradient is below this threshold, the block is compressed using an interpolation mode at step S52.

At step S52, an interpolation mode encodes the block by downsampling it by a factor 4×4 by averaging, and transmitting the four downsampled pixels in the bit-stream using 12- or 24-bit colors. Interpolation mode is well suited to gradients in complex business graphics and to smoothly changing colors in images.

If, at step S52, the maximum color gradient is equal to or above threshold $T_{GR}$, method M3 proceeds to step S66. Step S66 determines whether there is room for raw transmission of the current block for at least an 8-bit truncated raw mode. If there is sufficient room, the deepest mode, selected from 24-bit raw, 12-bit truncated raw, and 8-bit truncated raw, that can be accommodated by the available target block size is used to transmit the block. In this case, 12- and 8-bit truncated raw modes are provided for, so the threshold is less than for the corresponding step of method M2. (Bounding-box modes are not used.)

The threshold for step S66 depends of the current target block size, as indicated in FIG. 6 by the dashed arrow to step S66. If there is room for the most truncated raw mode, method M3 proceeds to step S53. Otherwise, a BTC-VQ mode is selected at S54. Once one of the mode types is selected, the specific mode selected is a function of the current target block size, as indicated in FIG. 6 by the dashed arrows to steps S51, S52, S53, and S54.

In the BTC family of modes at step S54, the decision as to which support block size (4×4, 4×8, 8×4, or 8×8) will be used, is determined partly by the available bytes figure, and partly by the maximum color ranges (defined earlier) for each 4×4, 4×8, 8×4 or 8×8 support block. The idea is to choose support blocks of as small color ranges as possible, without exceeding the available bytes figure. Depending on the support block size chosen, the required number of colors is transmitted with 24 or 12 bits each. Additionally, adaptive lossy compression of the mask is turned on, if at least one pair of colors is found to be close to each other.

Determination of the color quantization levels in the BTC-VQ modes is accomplished by fast approximate VQ design procedures. Because VQ design is one of the most-significant complexity bottlenecks in the encoding process, three different algorithms for VQ design, with varying trade-offs between complexity and performance, are implemented "best", "normal", and "fast". The best encoding method uses a single iteration of LBG design procedure Y. Linde, A. Buzo, and R. M. Gray, "An algorithm for vector quantizer design," *IEEE Trans. Commun.*, vol. COM-28, no.1, pp. 84–95, January 1980 with the mean-squared-error distortion measure, on the RGB triplets. The normal encoding method uses a single iteration of Lloyd's scalar quantizer design procedure S. P. Lloyd, "Least Squares Quantization in PCM," *IEEE Trans. Inform. Theory*, vol. IT-28, pp. 127–35, March 1982, with the mean-squared-error distortion measure, on the R, G, or B color component with the maximum range. The fast method of encoding again uses a single iteration of Lloyd's scalar quantizer design procedure with the mean-squared-error distortion measure, on approximate luminance values of the pixels computed as $L=(R+2G+B)/4$. Additionally, in the fast method, all the range computations encountered earlier in various decision mechanisms, are based on the approximate luminance values as well ($L_{max}-L_{min}$). Best, normal, and fast methods are similar to print quality settings in a printer with the same names.

A variant of method M3 omits interpolated modes S52 for faster throughput with a slight degradation is potential image quality. In this variant, when the number of color clusters is high at step S64, the variant method proceeds directly to room-for-raw step S66, omitting gradient threshold step S65. This variant avoids the added complexity of computing the maximum of the horizontal and vertical gradients in a block. However, including the interpolated mode produces better reproductions at higher compression for smooth image regions.

While method M3 provides for compression at higher ratios than 12:1, there is a cost in quality and/or processing time. For example, while method M3 can be run at a minimum desired compression ratio of 15:1, for 600+ dpi documents without artifacts, its per image encoding/decoding time may be too high (affecting throughput adversely).

Digitized documents at high resolutions require an enormous amount of storage. For example, a single-color letter-size page requires nearly 100 MB of storage at 600 dpi, and nearly 400 MB of storage at 1200 dpi. In order to keep hardcopy businesses competitive in price and performance at this resolution, it becomes imperative to design compound document encoders that achieve high compression ratios with very low complexity.

A high-resolution embodiment (not shown) of the invention achieves up to 15:1 compression without printed artifacts for compound documents at resolution 600 dpi and above, with very low complexity. The high-resolution method achieves compression ratios significantly higher than fast method M2 at a complexity that is lower than high-performance method M3. The trade-off is in the performance for low-resolution documents.

The high-resolution method uses exactly the same encoding modes as methods M2 and M3, but the size of the elemental processing unit is larger. The high-resolution method uses 12×12 blocks as opposed to 8×8. In BTC-VQ modes, the support blocks can be of size 6×6, 6×12, 12×6, or 12×12.

Figure 7:
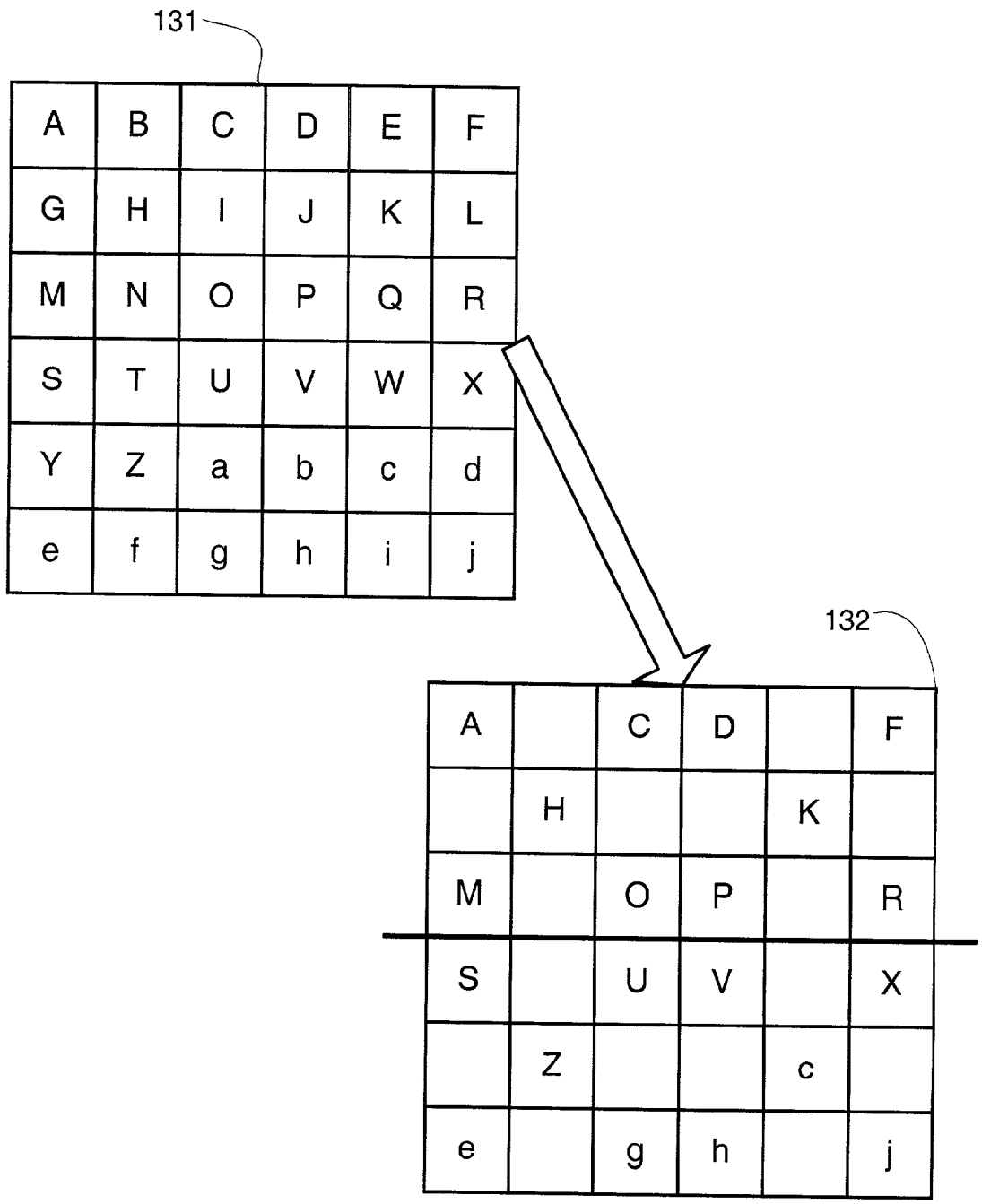
FIG. 7 is a schematic diagram illustrating the use of a mask in adaptive mask compression used in a "high-resolution" implementation of the method of FIG. 2.

In the n-color modes the sole difference is in the number of bytes sent for the mask data—indicated in FIG. 7. The 1-color mode does not require any mask data. The 2-color mode needs 18 bytes of mask data for a total of 144 pixels. The bits are entered within a byte from the MSB to the LSB in scan order. The 3-color mode requires 29 bytes for the mask data, with each byte containing information for five symbols in scan order. The 4-color mode requires 36 bytes for the mask data, with 2 bits entered in a byte per pixel from the MSB to the LSB in scan order. The 5- and 6-color modes need 48 bytes for the mask, where each byte contains three symbols in scan order. Finally, the 7- and 8-color modes need 54 bytes for the mask, with 3 bits for each pixel.

In the raw and truncated raw modes, the number of bytes that need to be transmitted are increased because of a larger number of pixels. Apart from the header, 144, 216 and 432 bytes are transmitted in the 8, 12, and 24 bpp modes respectively.

In the interpolated modes, the number of bytes that need to be transmitted in the interpolated modes change naturally because of a larger number of pixels. The downsampled image is now 3□3, and therefore requires 14 bytes (27 nibbles with the upper nibble of the last byte unused) in the 12-bit/pixel mode, and 27 bytes in the 24-bit/pixel mode, apart from the header.

In alternative embodiments, ease of hardware implementation drives the need for a compression algorithm using a 4-line buffer, as opposed to 8 lines for mainstream guaranteed-fit. This can be readily accommodated within the guaranteed-fit framework with minimal change in the bit-stream syntax. The basic bock size is simply changed to 4×16 from 8×8, with four 4×4 sub-blocks arranged within it side by side. The pixel-scanning pattern is in row-column order within each 4×4 sub-block, and traverses sub-blocks at a time from left to right. Most of the modes can now be used without any modification. The BTC modes allowed for 4×16 guaranteed-fit would be 4×4, 4×8 and 4×16, which are analogous to 4×4, 8×4 and 8×8 BTC modes respectively for 8×8 guaranteed-fit, considering the pixel scan order. The 4×8 BTC mode for 8×8 guaranteed-fit is not useful in this scenario, and can well be disabled. All other modes can be used as is without any modification whatsoever.

The present compression scheme is optimized by making the results of the compression for each block available for selecting the compression mode for the next block. However, this can constrain performance and is not appropriate where blocks are processed in parallel for higher performance. Accordingly, the present invention provides for the compression scheme associated with any given block to be a function of the compression achieved for blocks earlier than the immediately preceding block. Where strips of blocks are processed in parallel, each parallel "strip" can implement method M1 independently. Alternatively, the parallel processes can provide information to each other to optimize model selection. In other words, savings in one strip can inure to the benefit of another stripe.

While the invention has been described above with particular encoding modes and profiles, other modes and profiles can be used. In the illustrated embodiment, the compression is block based; alternatively, the invention provides for data to be presented hierarchically or in non-pixel-based formats. While, in the illustrated embodiment, the data is image data, the invention actually applies irrespectively of the meaning of the data. The basic approach could be used for video, audio, and graphic data of many types. While the illustrated system is designed for incorporation in printers, the invention has industrial applicability whenever image or other data must be stored in a limited space or transmitted via a limited bandwidth. These and other variations upon and modifications to the illustrated embodiments are provided for by the present invention, the scope of which is defined by the following claims.

What is claimed is:

1. A single pass compression method for regulating compression of serialized input data as a function of an in-progress measure of said compression:
   a) converting source data into a series of blocks each containing one or more colors, said series including a first block, intermediate blocks, and a last block;
   b) determining a baseline target block size based upon a target compression ratio for said source data;
   c) for each block in turn, determining a current target block size, the current target block size for said first block being said baseline target block size, the current target block size for said intermediate block and said last block being equal to the said current baseline target block size plus an accumulating savings associated with the preceding block in said series;
   d) for each block in turn, selecting a compression mode based on the number of colors in said block, said compression mode to compress that block so that the resulting compressed block fits its corresponding target block size as determined in step c; and
   e) for each block in turn, compressing the block using the compression mode selected in step d to yield a corresponding compressed block.

2. The method as recited in claim 1, further comprising:
   f) for each of said first and intermediate blocks in turn, determining said accumulated savings as a function of the size of the compressed block resulting from step e.

3. A method as recited in claim 2 wherein step f comprises determining the size of the compressed block resulting from step e and determining said savings in part as a function of said size.

4. A method as recited in claim 1 wherein said mode is selected from mode families, said mode families including an n-color mode family including lossless or lossy n-color compression modes, and a BTC-VQ mode family including lossy BTC-VQ compression modes.

5. A method as recited in claim 4, wherein said colors are clustered to form one or more color clusters, and said selected mode family is selected from said n-color mode family if said source image comprises less then a predetermined number of distinct color clusters and is selected from said BTC-VQ mode family if said source image comprises more than a predetermined number of distinct color clusters.

6. A method as recited in claim 4 wherein said families further include a raw mode family including at least a degenerate raw compression mode in which the current block is transmitted uncompressed.

7. A method as recited in claim 4 wherein said families further include an interpolated mode family including plural interpolation modes.

8. A method as recited in claim 5 wherein said predetermined number is four.

9. A method as recited in claim 1 wherein said source data comprises a compound document.

10. A method as recited in claim 1 wherein said function is greedy with respect to a target block size.

11. A single pass image compression system comprising:
   an encoder for sequentially compressing a series of source blocks each containing one or more colors, said encoder implementing plural compression modes with respective predetermined maximum compressed block sizes;
   a mode selector coupled to said encoder for selecting one of said compression modes for compressing a given source block based on the number of colors in said given source block, said mode selector selecting a compression mode at least in part as a function of a target block size for a current source block;
   an evaluator for determining the target block size for each of said source blocks; and
   an allocator for determining a baseline target block size based upon a target compression ratio for said source image.

12. A system as recited in claim 11 wherein said evaluator includes a block-size reader for determining the block size of a compressed block resulting from compressing of a respective source block, said evaluator determining said target block size in part as a function of the size of said compressed block.

13. A system as recited in claim 11 wherein said mode selector assigns some of said source blocks to an n-color mode family of n-color compression modes and other source blocks to a BTC-VQ mode family of BTC-VQ compression modes.

14. A system as recited in claim 13 wherein said mode selector assigns some of said source blocks to a raw mode family of modes including an uncompressed raw mode.

15. A system as recited in claim 14 wherein said raw mode family also includes truncated raw modes.

16. A system as recited in claim 15 wherein said mode selector assigns some of said source blocks to a family of interpolated compression modes.

* * * * *